Figure 1:
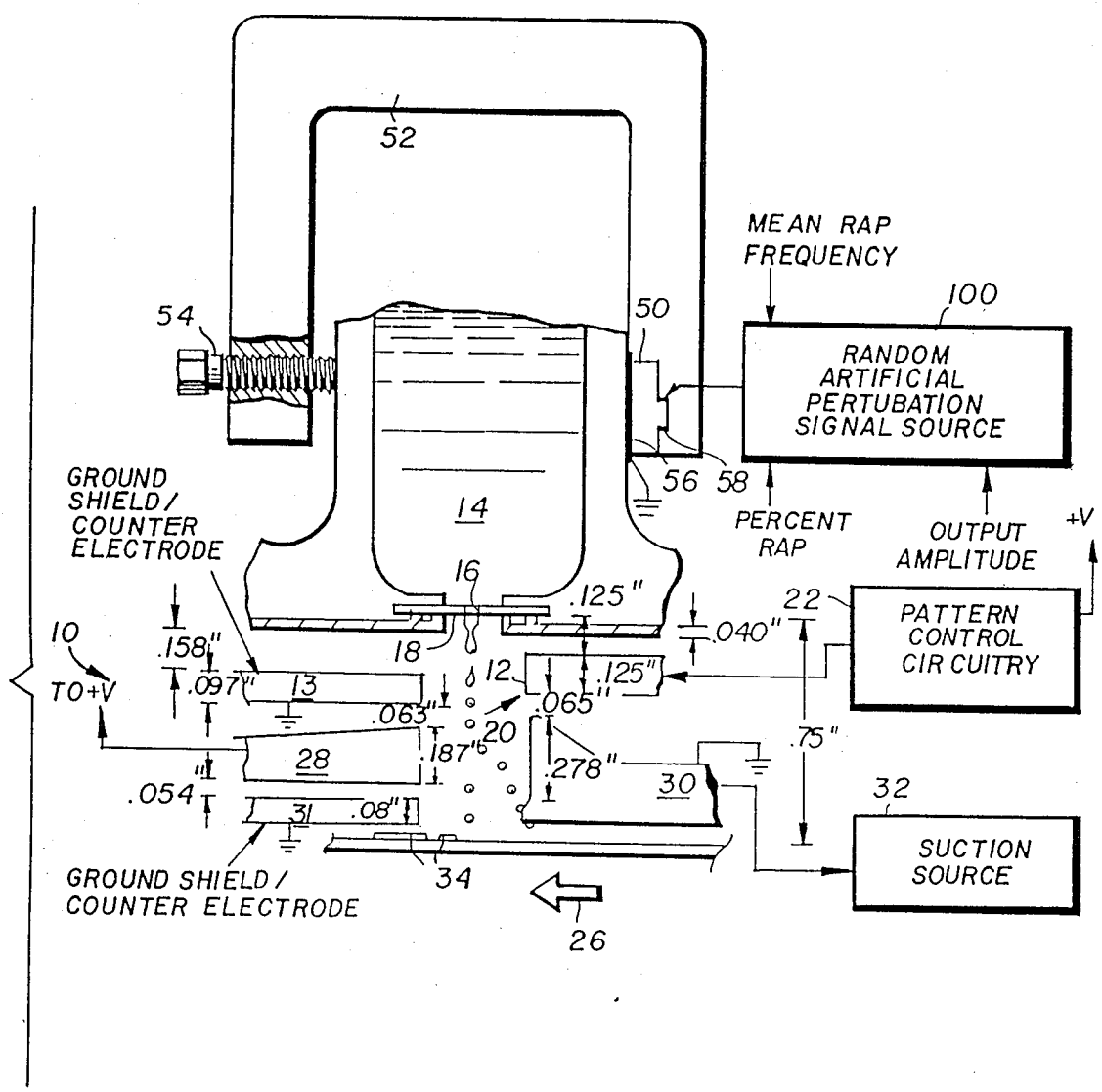

United States Patent [19]

Gamblin et al.

[11] Patent Number: 4,725,852
[45] Date of Patent: Feb. 16, 1988

[54] RANDOM ARTIFICIALLY PERTURBED LIQUID APPARATUS AND METHOD

[75] Inventors: Rodger L. Gamblin, Dayton; Roger C. Burchett, Miamisburg, both of Ohio

[73] Assignee: Burlington Industries, Inc., Greensboro, N.C.

[21] Appl. No.: 7,400

[22] Filed: Jan. 27, 1987

Related U.S. Application Data

[63] Continuation-in-part of Ser. No. 732,278, May 9, 1985, Pat. No. 4,644,369, which is a continuation-in-part of Ser. No. 428,490, Feb. 3, 1982, Pat. No. 4,523,202, which is a continuation-in-part of Ser. No. 231,326, Feb. 4, 1981, abandoned.

[51] Int. Cl.$^4$ .............................................. G01D 15/18
[52] U.S. Cl. ......................................... 346/75; 331/78; 346/1.1
[58] Field of Search ...................... 346/75, 1.1; 331/78; 364/717

[56] References Cited

U.S. PATENT DOCUMENTS

| | | | |
|---|---|---|---|
| 3,622,905 | 11/1971 | Brown | 331/78 |
| 3,986,168 | 10/1976 | Anderson | 364/717 X |
| 4,523,202 | 6/1985 | Gamblin | 346/75 |
| 4,644,369 | 2/1987 | Gamblin | 346/75 |

Primary Examiner—Joseph W. Hartary
Attorney, Agent, or Firm—Nixon & Vanderhye

[57] ABSTRACT

A frequency-stabilized oscillator is frequency modulated by band-limited random varying signals used to drive a suitable transducer randomly to and artificially perturb fluid jets in an electrostatic fluid jet applicator. Such random artificial pertubation is desirable (especially with longer cross-machine orifice plates) so as to obscure printing irregularities caused by standing wave or other phenomena. However, such random variations are best made with respect to a highly stabilized center frequency.

21 Claims, 2 Drawing Figures

RANDOM ARTIFICIALLY PERTURBED LIQUID APPARATUS AND METHOD

This application is a continuation-in-part of our earlier filed copending, commonly assigned application Ser. No. 732,278 filed May 9, 1985 now U.S. Pat. No. 4,644,369 which is, in turn, a continuation-in-part of copending commonly assigned application U.S. Ser. No. 428,490 to Gamblin filed Feb. 3, 1982 (now U.S. Pat. No. 4,523,202) which is, in turn, a continuation-in-part of copending commonly assigned U.S. application Ser. No. 231,326 to Gamblin filed Feb. 4, 1981 (abandoned in favor of U.S. Ser. No. 428,490). The entire content of U.S. Pat. No. 4,523,202 and of U.S. Pat. No. 4,644,369 is hereby incorporated by reference.

This invention is generally related to electrostatic fluid jet applicators for selectively applying fluid droplets to the surface of a relatively moving substrate. In particular, it is directed to an improved apparatus and method for stimulating the fluid droplet formation process in such an applicator.

The above-referenced related patent and application explain in some detail that the heretofore "conventional wisdom" of using only regular periodic (i.e., coherent) periodic droplet stimulation gives rise to various types of problems. For example, when cross-machine orifice plate dimensions considerably in excess of 10 or 12 inches (e.g., 1.8 meters for some textile applications) are employed, standing waves and/or other phenomena may cause pressure cusps and/or nulls to periodically occur in the cross-machine direction and thus give rise to defects (visual or otherwise) in fluid application to the underlying moving substrate. As already explained in the related patent/application, some of these adverse effects can be obscured (if not eliminated or at least minimized) by purposefully employing random artificial stimulations rather than purely coherent single frequency stimulation.

In earlier exemplary embodiments, band limited noise has been used directly and/or indirectly (e.g., to frequency modulate an oscillator). However, it has now been discovered that still further improved results can be had if band limited noise signals are used indirectly to frequency modulate a frequency-stabilized oscillator—(i.e., an oscillator carefully controlled so as to have a substantially constant and predetermined mean frequency).

In the presently preferred exemplary embodiment, a crystal controlled oscillator provides a very stable frequency reference input to a conventional phase locked loop (PLL) oscillator. Thus, the output of the PLL oscillator would normally be very frequency stable as will be appreciated by those in the art. However, provisions are made for injecting a narrow bandwidth limited noise signal so as to frequency modulate the PLL oscillator about its highly stabilized center frequency. The result is a stable synthesized randomly varying signal (frequency modulated by bandwidth-limited noise) for use in driving a piezoelectric crystal transducer acoustically coupled to the fluid medium used for electrostatic printing. That is, after amplification, the stimulation signal which randomly varies within a narrow bandwidth about a frequency stabilized center frequency is acoustically applied to fluid ejected by an elongated linear array of orifices so as to control fluid droplet formation. Such noise modulation serves to break up harmonic beat patterns related to fabric speed, print pulse duration and/or stimulation forces. Such beat patterns can cause unpredictable 'moire' patterns or other objectionable defects in the printing process (especially with respect to elongated cross-machine dimensions substantially in excess of 10 or 12 inches). At least in part, such harmonic beat patterns can be rendered unobjectionable by "blurring" such patterns with randomly varying perturbations.

In the preferred exemplary embodiment, the PLL oscillator includes a programmable frequency multiplication counter which can be loaded by an input multi-bit digital word so as to periodically count down from the preloaded and predetermined contents. Thus, the frequency-stabilized center frequency of the oscillator easily may be varied under control of the input multi-bit word. In the exemplary embodiment the ultimate stimulation center frequency (e.g., after a post scaler frequency division which provides reduction in phase noise and residual frequency modulation amplitude while still permitting fast loop settling with frequency changes) may be variable in 10 Hz steps from 5.12 kHz to 40.96 kHz. One or more bits of the multi-bit word may be decoded and used to provide on/off control of the random stimulation circuit thus facilitating remote control via a supervisory digital data processor.

As in earlier embodiments, the source of band-limited noise signals may include a cascaded chain of tuned amplifiers connected so as to amlify a noise signal source. In the presently preferred embodiment, a reverse-biased zener diode or the like (e.g., the emitter-base junction of a transistor) are used so as to provide a more reliable source of noise signals. In addition, a two-stage active low-pass filter is preferably employed so as to further reduce the amplitude of possible higher frequency components which otherwise might be included in the randomly varying band-limited noise signal.

The amplitude of output from the active low-pass filter is then passed through a digitally controlled attenuator (e.g., a digital-to-analog converter with the signal to be attenuated connected as the input reference source). In effect, the variable attenuator permits control (via an input multi-bit digital word) over the magnitude of frequency deviation to be achieved when the attenuator noise signals are subsequently used to modulate the PLL oscillator. This percent "RAP" (random artificial perturbation) is, in the exemplary embodiment, adjustable in 256 even steps of approximately ±10 Hz with a minimum setting of 10 Hz deviation (which produces negligible effect on print quality). Since the digital-to-alalog converter represents a controlled current output, it is followed by a current-to-voltage converter stage after which the now properly bandlimited and amlitude controlled noise signals are AC coupled to a modulation input of the PLL oscillator. Because of the AC coupling, the mean frequency of the PLL oscillator will be substantially unaffected—i.e., the mean frequency of the PLL oscillator will remain as a highly frequency stable parameter of the oscillator.

The synthesized stimulation signal (possibly after post scaler frequency division from the PLL oscillator output) is then passed through a further low-pass filter and another digitally controlled attenuator before passing to driver amplifiers and a piezoelectric crystal acoustic transducer coupled to the liquid. The digitally controlled attenuator thus permits final driver output amplitude to be controlled by an input multi-bit digital word in 256 even steps (e.g., from 20 mV peak-to-peak to 5V peak-to-peak).

The result is a very stable synthesized randomly varying stimulation output which may be remotely controlled (e.g., via a digital data processor) with respect to degree of randomness (e.g., percent RAP), frequency stabilized center frequency, the amplitude of the final stimulation drive signal and even the on/off status of the stimulation subsystem.

Figure 2:
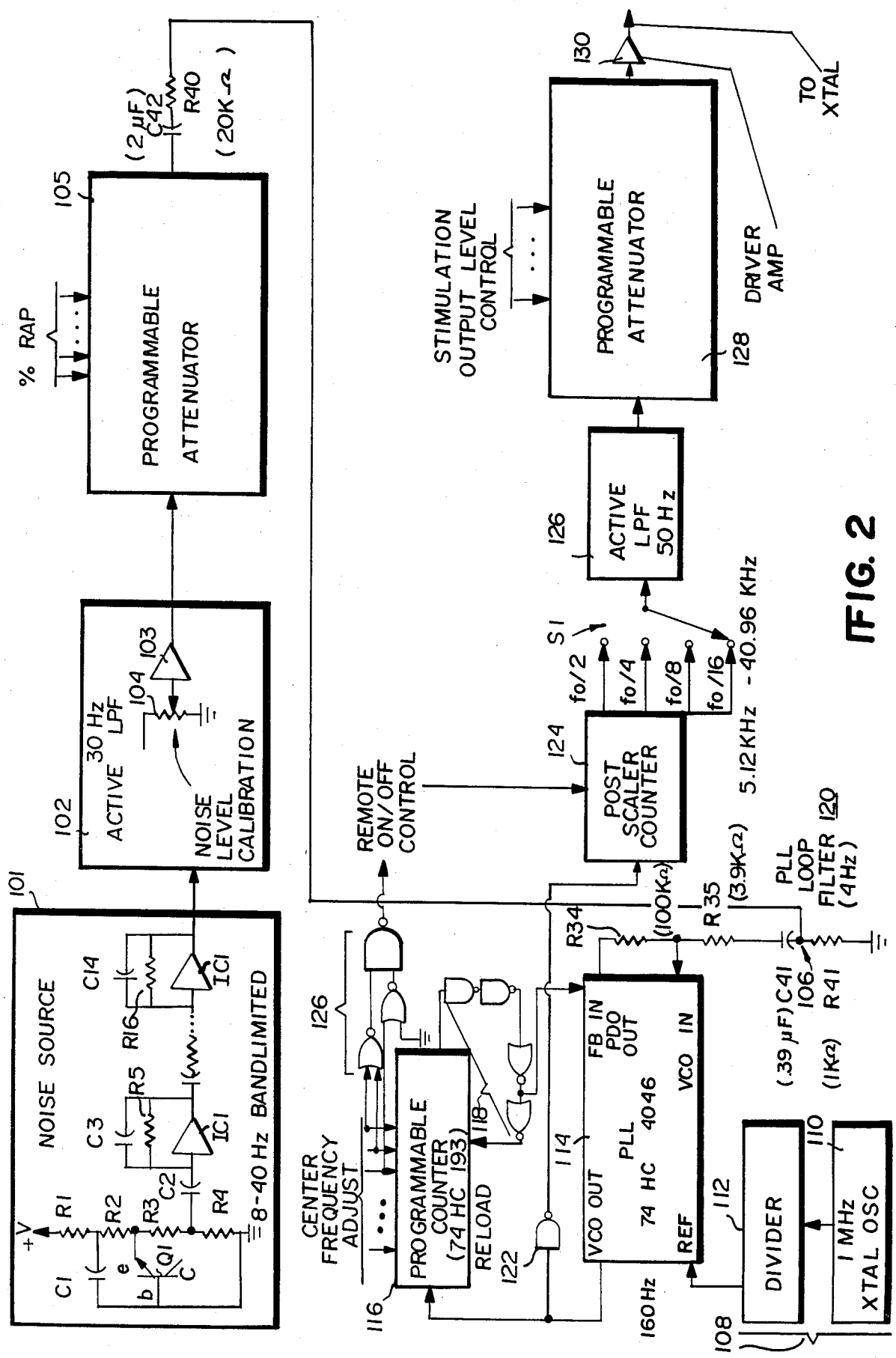

These as well as other objects and advantages of the invention will be more completely appreciated and understood by carefully reading the following more detailed description of the presently preferred exemplary embodiment when taken in conjunction with the accompanying drawings of which:

FIG. 1 is a generalized schematic view of an artificially perturbed electrostatic fluid jet applicator apparatus and method using random artificial perturbation in accordance with this invention; and FIG. 2 is a schematic block diagram of electrical circuits used in the presently preferred exemplary random artificial perturbation signal source of FIG. 1.

A random artificially perturbed electrostatic fluid jet applicator 10 is generally depicted in cross section and schematic form at FIG. 1. It includes a pressurized reservoir of fluid 14 feeding a linear array (oriented with its cross-machine axis perpendicular to the plane of FIG. 1) of orifices 16 in an orifice plate 18 so as to produce liquid filaments from each orifice which break into droplets along a droplet formation zone 20. If a proximately positioned electrode 12 has been energized (e.g., by conventional pattern control circuitry 22) at the time a droplet is formed, then such droplet will become electrostatically charged (e.g., by trapping thereon an induced electric charge). A combination shielding/counter electrode 13 is typically faced on the opposite side of the jet array to assist in the charging process. After the droplets are formed at zone 20, they continue to fall downwardly toward a substrate 24 moving in a "machine" direction 26 transverse to the "cross-machine" direction of arrayed orifices 16 (the "cross-machine" direction is perpendicular to the plane of FIG. 1). During such passage, the droplets fall into a constant transverse electrostatic deflection field defined by electrodes 28, 30. Another grounded shield/counter electrode 31 may typically be employed at the lower portion of catcher 30. Electrode 30 is actually constructed as a droplet "catcher" structure. Typically, a suction source 32 is utilized to remove the droplets from the catcher 30 and to return them to a fluid supply for fluid reservoir 14. In this manner, desired patterns of print 34 may be achieved on the passing substrate by selective deposition of droplets.

The dimensions depicted in FIG. 1 are those for a non-limiting exemplary embodiment and will vary from one specific application/embodiment to another as will be appreciated by those in the art. The cross machine dimension may vary considerably but may be as much as 1.8 meters for typical textile processing applications.

An electro-acoustic transducer such as piezoelectric crystal 50 is typically acoustically coupled to the fluid filaments in such a manner as to influence the droplet formation process. In the exemplary embodiment, such coupling is achieved by mechanically clamping the piezoelectric crystal 50 to a sidewall of the fluid reservoir 14. As depicted in FIG. 1, a relatively massive clamp 52 (including adjustment screw 54) is utilized to maintain the piezoelectric crystal apparatus in intimate contact with a sidewall of a fluid reservoir. Typically, a thin flexible conductive sheet electrode 56 (e.g., beryllium-copper) may form one electrode on the piezoelectric crystal while another electrode 58 is driven by a random artificial perturbation signal source 100. As indicated in FIG. 1, the exemplary signal source 100 includes control inputs (e.g., manual adjustment of potentiometers or the like) for determining the mean random artificial perturbation (RAP) frequency as well as the percent RAP and the amplitude of output signals actually delivered to drive the piezoelectric crystal 50.

The random artificial perturbation signal source 100 in FIG. 1 is shown in more detail for the present exemplary embodiment at FIG. 2. A supervisory control circuit (not shown) may provide multi-bit digital words as TTL level inputs to control the center frequency, output amplitude and noise deviation (% RAP) of the circuit shown in FIG. 2. For example, frequency may be variable in 10 Hz steps from 5.12 kHz to 40.96 kHz by supplying a digital control word having a value of $2^9$ through $2^{12}$ inclusive. On the other hand, a program value less than $2^9$ may be decoded so as to disable the FIG. 2 circuit. Output amplitude (prior to final driver amplification) may be programmable from approximately 20 mv peak-to-peak minimum to 5V peak-to-peak in 256 even steps via a multi-bit digital word provided as TTL level inputs. The percent RAP may be adjustable in 256 even steps of approximately 10 Hz via yet another multi-bit digital word input as TTL level signals. Although the stimulation subsystem of FIG. 2 may be completely disabled in the exemplary embodiment my merely supplying a control frequency word having a value of less than $2^9$, alternatively, separate controlling enable lines or the like may be provided for effecting on/off control as should be apparent.

Noise source 101 includes a broadband noise source such as a reverse biased emitter-base junction of a small signal bipolar transistor Q1. Broadband noise from this source is a.c. coupled via capacitor C2 to the input of a cascaded chain of tuned amplifiers IC1 having an inherent bandwidth of approximately 8–40 Hz. In the present exemplary embodiment, six such cascaded stages of tuned amplifier/limiters are used. In short, each stage of a CMOS hex inverter integrated circuit is linearly biased with RC coupling and feedback networks at each stage so as to limit frequency response to the 8 Hz–40 Hz band. The saturated output wave form of the final stage is clamped to the power supply voltage (e.g. 5V peak-to-peak), while the frequency of transitions between the saturated limits varies within the narrow 8–40 Hz band.

Due to the limiting process involved with this type of process, the output of the noise source 101 may contain high level high frequency components. Accordingly, the output of noise source 101 is passed through an active low-pass filter 102 which, in the exemplary embodiment, has an upper corner frequency of approximately only 30 Hz. As will be appreciated by those in the art, a suitable active low-pass filter may include two cascaded operational amplifiers with suitable RC feedback and coupling. In the exemplary embodiment, a buffer amplifier 103 is also employed together with potentiometer 104 so as to provide a noise signal calibration level control.

The ouput of the active low-pass filter 102 is then passed through a programmable attenuator 105. One suitable such attenuator may be realized by employing a digital-to-analog converter (e.g., of an integrated circuit type 0802) with the input signal connected its reference terminal and with the output passed through a conventional current to voltage converter. The multi-bit digital word input to such a digital-to-analog converter then actually controls the degree of attenuation between its reference input terminal and its output terminal. In the exemplary embodiment, this means that the amplitude of the noise modulation signal is controlled and this, in turn, will ultimately control the magnitude of frequency deviation achieved when used to frequency modulate an oscillator. In the exemplary embodiment, this degree of randomness is sometimes termed percent RAP.

The output of programmable attenuator 105 is then AC coupled via C42 and series resistance R40 to summing node 106 (the noise modulation input to a frequency-stabilized oscillator).

A reference signal source 108 may typically include a crystal stabilized oscillator 110 followed by a digital frequency divider chain 112 so as to produce a very stable 160 Hz reference signal. A hybrid crystal stabilized 1.6 MHz oscillator may be provided directly on the same printed circuit board with the digital divider chain or, alternatively, the reference signal may be externally generated and connected to the circuit in FIG. 2. In any even, the reference signal is of high accuracy and stability as well as low noise content (which is directly reflected in the synthesizer output). If the digital divider chain 112 is provided on the same circuit board, output taps from several of its stages may be provided for other usages as will be apparent.

The phase-locked loop oscillator is itself of a conventional type. For example, it may comprise a standard phase detector and VCO in integrated circuit form as depicted at 114. The output of the VCO is input to an external programmable counter 116 whose counting modulus determines the frequency multiplication ratio between the input reference frequency and the VCO output. That is, if the input reference frequency is F and if the programmable counter has a counting modulus of N (i.e., it "turns over" after N input cycles), then the output of the VCO will have a frequency of NF. The frequency divided output NF/N=F of the programmable counter 116 is then connected back to the feedback input terminal of block 114 (i.e., so that it may be phase compared to the input reference signal F).

In the exemplary embodiment, time delay gates 118 are interposed in the feedback loop so as to insure that the counter stages are properly settled before they are signalled to reload the starting content provided as an externally supplied multi-bit digital word representing the center frequency of the synthesizer.

The phase detector output from block 114 is connected via resistance R34 to the VCO input. In addition, a PLL loop filter 120 is typically connected so as to "smooth out" the phase detector output signal (which is typically pulse-width modulated) in the exemplary embodiment loop filter 120 has a corner frequency of approximately 4 Hz. A resistor R35 has been added (relatively small with respect to resistors R40 and R34) so as to create a suitable modulation signal injection node 106. Thus, the loop filter 120 also determines the minimum noise modulation frequency which can be applied. The maximum modulation rate is, of course, already determined by the band limited nature of the noise source 101 and the active low-pass filter 102. This noise signal is injected at node 106 to also modulate the VCO control of the phase lock loop 114 and, consequently, it will be reflected in the phase detector output. However, the loop filter 120 rejects "correction" frequencies above its corner frequency of approximately 4 Hz and, accordingly, only input noise modulation above that frequency will actually cause frequency modulation of the phase lock loop VCO output.

The 30 Hz corner frequency for the active noise low-pass filter 102 and the 4 Hz corner frequency for the loop filter 120 were determined experimentally to be suitable limits in this exemplary system. Because the electrostatic printer system is typically very sensitive to changes in stimulation, it has been found to be important that the system be inherently highly stable and of low noise (the center frequency) with only a precisely controlled noise frequency modulation (RAP) being applied.

The RC combination C42+C43 and R40+R41 forms a 4 Hz low-pass filter. A small portion (R41/(R42+R41)) of the noise voltage is present at the high end of R41. The loop corner frequency is determined by R34 and C41 also at about 4 Hz. A small resistance equivalent to the parallel combination of R41 and R35 in series with R41 appears in series with C41. This permits the PLL to have a small amount of control over frequencies above the 4 Hz corner frequency to permit quicker settling time when the frequency is changed without significantly reducing the desired modulation.

Since a small portion of the noise signal is present at the high end of R41, (e.g., 4–30 Hz), this signal coupled into the PLL VCO input where it modulates the VCO. The error correction signal at the phase detector output has little effect in reducing the desired noise modulation due to the relatively long time constant of R34 and C41.

In the exemplary embodiment, the programmable counter 116 provides controlled VCO frequency range from 81.92 kHz to 655.6 kHz. This output is picked off via gate 122 and input to the post scaler counter 124. As indicated in FIG. 2, decoding gates 126 may be connected to the most significant bits of the multi-bit center frequency control word so as to inhibit the post scaler counter 124 unless the center frequency control word has a value greater than $2^9$.

The post scaler counter 124 may be a conventional digital frequency divider which reduces the maximum VCO output frequency to 40.96 kHz when the divisor factor is 16. Other interstage divider outputs may also be provided and be switch selectable via S1 as indicated in FIG. 2, if desired. In the exemplary embodiment, the divided by 16 output changes in step frequency increments of approximately 10 Hz based upon the provided multi-bit frequency control word input to programmable counter 116. Use of a post scaler counter 24 also provides a 16 to 1 reduction in phase noise and residual frequency modulation amplitude while allowing fast PLL loop settling with frequency changes. When noise modulation is applied, this counter reduces the apparent frequency deviation by 16 to 1—but the modulation rate remains unaffected. Calibration adjustment 104 may be used to compensate for gain changes.

A further active low-pass filter 126 (e.g., having an upper corner frequency of 50 Hz) receives the output of the frequency-stabilized frequency modulated oscillator and processes that signal so as to diminish possible high frequency components otherwise present in the synthesized output which would otherwise waste power and/or produce unnecessary heating or ringing of the stimulation driver amplifier and crystal circuits. In the exemplary embodiment, a three-stage active low-pass filter with appropriate RC feedback and interstage coupling is utilized and is of conventional design.

To provide accurate control over the output level of the synthesized random stimulation signals, a further programmable attenuator 128 (e.g., another 8 bit digital-to-alalog converter followed by a suitable current-to-voltage converter stage) is provided. With the input signal coupled to the reference terminal of the digital-to-analog converter (properly calibrated for gain and offset), the output represents an attenuation version of the input signal with the degree of attenuation depending upon the value of the multi-bit stimulation control signal (e.g., as supplied by an external digital data processor).

Conventional power drive amplifiers 130 may also be employed before the randomly varying stimulation signal is actually applied to the piezoelectric crystal for applying random artificial perturbations to the fluid of the electrostatic applicator.

While only one exemplary embodiment of this invention has been described in detail, those skilled in the art will appreciate that there are many possible variations and modifications which may be made in this embodiment while yet retaining many of the novel features and advantages. Accordingly, all such modifications and variations are intended to be included within the scope of the appended claims.

What is claimed is:

1. An electrostatic fluid jet applicator of the type which utilizes random artificial perturbation of the fluid and including structure for producing such random perturbation which comprises:
   an electrically driven transducer coupled to said fluid;
   a source of randomly varying signals; and
   a frequency-stabilized oscillator connected so as to be frequency modulated by said randomly varying signals and to provide a corresponding randomly varying output connected to drive said transducer.

2. An electrostatic fluid jet applicator as in claim 1 wherein said source of randomly varying signals comprises:
   a band-limited source of controlled amplitude noise signals.

3. An electrostatic fluid jet applicator as in claim 2 wherein said band-limited source comprises:
   a reverse-biased diode having noise signals thereacross;
   a high-gain bandpass amplifier connected to amplify said noise signals;
   an active low-pass filter (LPF) connected to receive the amplified noise signals from said amplifier and to supply LPF noise signals; and
   a variable and controllable attenuator connected to receive said LPF noise signals and to supply said randomly varying signals at a controlled amplitude.

4. An electrostatic fluid jet applicator as in claim 3 wherein said variable and controllable attenuator comprises:
   a digital-to-analog converter having a reference input connected to receive said LPF noise signals.

5. An electrostatic fluid jet applicator as in claim 1 wherein said frequency-stabilized oscillator comprises:
   a PLL oscillator having a phase detector for comparing the phase of a supplied frequency stable reference signal with that of a feedback signal, a VCO controlled by the phase detector to produce an output PLL signal, a programmable counter for dividing the frequency of the output PLL signal and supplying the feedback signal, and a low-pass loop filter connected between the phase-detector and VCO and connected to receive said randomly varying signals.

6. An electrostatic fluid jet applicator as in claim 1 further comprising:
   a post-scaler frequency divider connected to receive the output of the frequency-modulated frequency-stabilized oscillator and to provide a lower divided frequency signal for use in driving the transducer.

7. An electrostatic fluid jet applicator as in claim 5 further comprising:
   a post-scaler frequency divider connected to receive the output of the frequency-modulated frequency-stabilized oscillator and to provide a lower divided frequency signal for use in driving the transducer.

8. An electrostatic fluid jet applicator as in claim 5 wherein said programmable counter is periodically reset to a supplied starting multi-bit content so as to determine its effective modulus and wherein at least one predetermined bit of such supplied content is monitored and used to turn on and off said random artificial perturbation.

9. An electrostatic fluid-jet applicator as in claim 1 further comprising:
   a variable and controllable attenuator connected to receive said randomly varying output and to provide such output at a controlled amplitude for use in driving said transducer.

10. An electrostatic fluid jet applicator as in claim 9 wherein said attenuator comprises:
    a digital-to-analog converter having a reference input connected to receive said randomly varying output.

11. An electrostatic fluid jet applicator for applying fluid droplets to the surface of a relatively moving substrate, said applicator being of the type which includes random artificial perturbation means acoustically coupled to the fluid for artificially stimulating the formation of said droplets at a rate which is controllably varied, said random artificial perturbation means comprising:
    an electro-acoustic transducer;
    a band-limited source of randomly varying signals; and
    a phase locked loop (PLL) oscillator circuit having (1) a reference input supplied by a frequency-stable oscillator, (2) phase detector output and VCO input terminals with a low-pass loop filter connected thereto and also connected to receive said randomly varying signals and (3) a PLL output terminal supplying the output of the PLL oscillator adapted for use in driving said electro-acoustic transducer.

12. An electrostatic fluid jet applicator as in claim 11 wherein said band-limited source of randomly varying signals comprises:
    a reverse-biased p-n junction connected to supply noise signals to the input of a cascaded chain of tuned amplifiers having a predetermined bandwidth of less than 100 Hz;
    an active low-pass filter connected to receive and process the output of said tuned amplifiers; and
    a digitally controlled variable attenuator connected to receive and process the output of said low-pass filter and to provide said randomly varying signals.

13. An electrostatic fluid jet applicator as in claim 11 wherein:
said frequency-stable oscillator includes a crystal-controlled oscillator.

14. An electrostatic fluid jet applicator as in claim 11 wherein said loop filter comprises an RC filter connected to the VCO input terminals via a further resistor and wherein said randomly varying signals are connected to a node joining said further resistor to said RC filter.

15. An electrostatic fluid jet applicator as in claim 11 wherein said PLL oscillator circuit includes a feedback counter having a counting modulus which is controlled by a multi-bit input digital signal and wherein at least one bit of such digital signal is connected to provide on/off control of the random perturbation process.

16. An electrostatic fluid jet applicator as in claim 11 further comprising:
a post-scaler frequency divider connected to frequency divide the output of said PLL oscillator circuit;
an active low-pass filter connected to receive and process the output of said frequency divider; and
a digitally controlled variable attenuator connected to receive and process the output of the low-pass filter and to provide said randomly varying output at a predetermined amplitude.

17. An electrostatic fluid jet application method of the type which utilizes random artificial perturbation of the fluid and including structure for producing such random perturbation which comprises:
electrically driving a transducer coupled to said fluid;
providing a source of randomly varying signals; and
frequency modulating a frequency-stabilized oscillator by said randomly varying signals and providing a corresponding randomly varying output connected to drive said transducer.

18. An electrostatic fluid jet application method as in claim 17 wherein said source of randomly varying signals comprises:
a band-limited source of controlled amplitude noise signals.

19. An electrostatic fluid jet application method as in claim 17 wherein said frequency modulating step comprises:
comparing the phase of a supplied frequency stable reference signal with that of a feedback signal, producing from a VCO an output PLL signal;
dividing the frequency of the output PLL signal to supply the feedback signal;
low-pass filtering signals passing between the phase-detector and VCO, and
injecting said randomly varying signals into the low-pass filtering process to modulate said VCO.

20. An electrostatic fluid jet application method as in claim 17 further comprising:
post-scaler frequency dividing the output of the frequency-modulated frequency-stabilized oscillator to provide a lower divided frequency signal for use in driving the transducer.

21. An electrostatic fluid jet application method as in claim 20 wherein a programmable counter in the PLL is periodically reset to a supplied starting multi-bit content so as to determine its effective modulus and wherein at least one predetermined bit of such supplied content is monitored and used to turn on and off said random artificial perturbation.

* * * * *